United States Patent
Jo et al.

(10) Patent No.: US 11,412,495 B2
(45) Date of Patent: Aug. 9, 2022

(54) METHOD FOR TRANSMITTING OR RECEIVING SIGNAL IN WIRELESS COMMUNICATION SYSTEM AND DEVICE THEREFOR

(71) Applicant: LG Electronics Inc., Seoul (KR)

(72) Inventors: Soonki Jo, Seoul (KR); Yunjung Yi, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 139 days.

(21) Appl. No.: 16/637,550

(22) PCT Filed: Aug. 7, 2018

(86) PCT No.: PCT/KR2018/008961
§ 371 (c)(1),
(2) Date: Feb. 7, 2020

(87) PCT Pub. No.: WO2019/031812
PCT Pub. Date: Feb. 14, 2019

(65) Prior Publication Data
US 2020/0260417 A1  Aug. 13, 2020

Related U.S. Application Data

(60) Provisional application No. 62/548,339, filed on Aug. 21, 2017, provisional application No. 62/543,979, (Continued)

(51) Int. Cl.
H04W 72/04 (2009.01)
(52) U.S. Cl.
CPC ..... *H04W 72/042* (2013.01); *H04W 72/0446* (2013.01)

(58) Field of Classification Search
CPC .................. H04W 72/042; H04W 72/0446
See application file for complete search history.

(56) References Cited

U.S. PATENT DOCUMENTS

2021/0168844 A1* 6/2021 Takeda .................. H04L 5/0078

FOREIGN PATENT DOCUMENTS

WO     WO2016123393     8/2016

OTHER PUBLICATIONS

Extended European Search Report in European Patent Application No. 18843721.4, dated Jun. 22, 2020, 11 pages.

(Continued)

*Primary Examiner* — Melvin C Marcelo
(74) *Attorney, Agent, or Firm* — Fish & Richardson P.C.

(57) ABSTRACT

A method by which a terminal receives a downlink signal in a wireless communication system, according to one embodiment of the present invention, comprises the steps of: receiving information on a payload size of a group common-physical control channel (GC-PDCCH), which should be monitored by the terminal, and information on a control channel element (CCE) aggregation level of the GC-PDCCH, which should be monitored by the terminal; monitoring the GC-PDCCH in a control resource set (CORESET) on the basis of the information on the payload size of the GC-PDCCH and the information on the CCE aggregation level of the GC-PDCCH; and obtaining a slot format indication (SFI) through the GC-PDCCH. The terminal is capable of communicating with at least one of another terminal, a terminal related to an autonomous driving vehicle, a base station or a network.

14 Claims, 6 Drawing Sheets

Related U.S. Application Data filed on Aug. 11, 2017, provisional application No. 62/541,787, filed on Aug. 7, 2017.

(56) References Cited

OTHER PUBLICATIONS

CATT, "Group-common PDCCH structure and configuration," R1-1707500, 3GPP TSG RAN WG1 Meeting #89, Hangzhou, P.R. China, May 15-19, 2017, 5 pages.
CATT, "Channel structure for group-common PDCCH," R1-1710080, 3GPP TSG RAN WG1 Meeting #AH_NR2, Qingdao, P.R. China, Jun. 27-30, 2017, 3 pages.
CATT, "[89-20] email discussion: Group-common PDCCH for NR," R1-1710968, 3GPP TSG RAN WG1 Meeting #AH_NR2, Qingdao, P.R. China, Jun. 27-30, 2017, 22 pages.
Ericsson, "On Group-Common PDCCH Structure and Configuration," R1-1711483, 3GPP TSG RAN WG1 NR Ad-Hoc#2, Qingdao, P.R. China, dated Jun. 27-30, 2017, 4 pages.
InterDigital Inc., "On group-common PDCCH design," R1-1710947, 3GPP tsg ran WG1 NR Ad-Hoc#2, Qingdao, China, dated Jun. 27-30, 2017, 3 pages.
LG Electronics, "Discussion on the contents of group common PDCCH," R1-1710310, 3GPP TSG RAN WG1 NR Ad Hoc #2, Qingdao, China, dated Jun. 27-30, 2017, 6 pages.
PCT International Search Report in International Application No. PCT/KR2018/008961, dated Nov. 21, 2018, 16 pages (with English translation).
Samsung, "UE-Common NR-PDCCH Transmission Aspects," R1-1707999, 3GPP TSG RAN WG1 #89, Hangzhou, China, dated May 15-19, 2017, 3 pages.

* cited by examiner (a)

(b)

METHOD FOR TRANSMITTING OR RECEIVING SIGNAL IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2018/008961, filed on Aug. 7, 2018, which claims the benefit of U.S. Provisional Application No. 62/548,339, filed on Aug. 21, 2017, U.S. Provisional Application No. 62/543,979, filed on Aug. 11, 2017, and U.S. Provisional Application No. 62/541,787, filed on Aug. 7, 2017. The disclosures of the prior applications are incorporated by reference in their entirety.

TECHNICAL FIELD

The present disclosure relates to a wireless communication system, and more particularly, to a method and apparatus for transmitting or receiving a downlink signal.

BACKGROUND ART

First, the existing 3GPP LTE/LTE-A system will be briefly described. Referring to FIG. 1, a user equipment (UE) performs an initial cell search (S101). In the initial cell search process, the UE receives a Primary Synchronization Channel (P-SCH) and a Secondary Synchronization Channel (S-SCH) from a base station (BS), performs downlink synchronization with the BS, and acquires information such as a cell ID. Thereafter, the UE acquires system information (e.g., MIB) through a PBCH (Physical Broadcast Channel). The UE may receive the DL RS (Downlink Reference Signal) and check the downlink channel status.

After the initial cell search, the UE may acquire more detailed system information (e.g., SIBs) by receiving a Physical Downlink Control Channel (PDCCH) and a Physical Downlink Control Channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE may perform PDCCH/PDSCH reception (S107) and Physical Uplink Shared Channel (PUSCH)/Physical Uplink Control Channel (PUCCH) transmission (S108) as a general uplink/downlink signal transmission procedure. The UE may transmit UCI (Uplink Control Information) to the BS. The UCI may include HARQ ACK/NACK (Hybrid Automatic Repeat reQuest Acknowledgment/Negative ACK), SR (Scheduling Request), CQI (Channel Quality Indicator), PMI (Precoding Matrix Indicator) and/or RI etc.

DISCLOSURE

Technical Problem

The object of the present disclosure is to provide a method of transmitting or receiving a group-common PDCCH for indicating a slot format accurately and efficiently and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of receiving a downlink signal by a UE in a wireless communication system. The method may include receiving information on a payload size of a group common-PDCCH (GC-PDCCH) that the UE needs to monitor and information on a control channel element (CCE) aggregation level of the GC-PDCCH that the UE needs to monitor, monitoring the GC-PDCCH in a control resource set (CORESET) based on the information on the payload size of the GC-PDCCH and the information on the CCE aggregation level of the GC-PDCCH, and obtaining a slot format indication (SFI) from the GC-PDCCH.

In another aspect of the present disclosure, provided herein is a UE for receiving a downlink signal. The UE may include a transceiver and a processor.

The processor may be configured to control the transceiver to receive information on a payload size of a GC-PDCCH that the UE needs to monitor and information on a CCE aggregation level of the GC-PDCCH that the UE needs to monitor, monitor the GC-PDCCH in a CORESET based on the information on the payload size of the GC-PDCCH and the information on the CCE aggregation level of the GC-PDCCH, and obtain an SFI from the GC-PDCCH.

The information on the payload size of the GC-PDCCH and the information on the CCE aggregation level of the GC-PDCCH may be received through higher layer signaling.

The monitoring of the GC-PDCCH may be performed on a first carrier, and the UE may determine the slot format of a second carrier based on the SFI obtained from the GC-PDCCH on the first carrier.

When the subcarrier spacing of the first carrier is different from that of the second carrier, the UE may start to apply the determined slot format to a slot located after the slot on the second carrier, which corresponds to the time at which the UE obtains the SFI.

The CORESET for the GC-PDCCH and a synchronization signal block (SSB) may be included in the same slot, and the periodicity of the CORESET may be determined based on the periodicity of the SSB.

The second carrier may be a carrier in a millimeter wave (mmWave) frequency band.

When the SFI changes the direction of an uplink resource on which the UE is to transmit a PUSCH, the UE may ignore the SFI and perform the PUSCH transmission, drop the PUSCH transmission and request a BS to send an uplink grant again, or delay the PUSCH transmission by a predetermined time based on the SFI.

Advantageous Effects

According to present disclosure, information on the payload size and aggregation level of a GC-PDCCH that a UE needs to monitor may be provided, thereby reducing UE complexity related to GC-PDCCH monitoring (e.g., blind decoding) and transmitting and receiving the GC-PDCCH accurately and efficiently.

It will be appreciated by persons skilled in the art that the effects that may be achieved with the present disclosure are not limited to what has been particularly described hereinabove and other advantages of the present disclosure will be more clearly understood from the following detailed description taken in conjunction with the accompanying drawings.

BEST MODE

Figure 1:
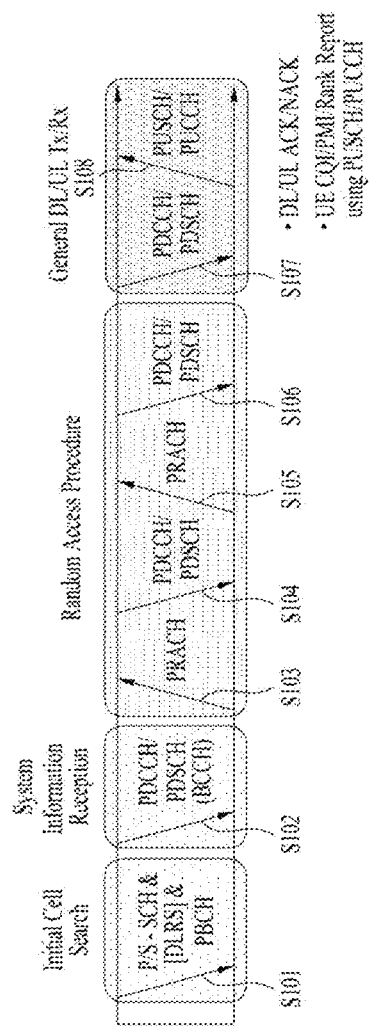
FIG. 1 is an exemplary diagram illustrating physical channels used in a 3rd Generation Partnership Project (3GPP) Long Term Evolution/Long Term Evolution-Advanced (LTE/LTE-A) system, and a general signal transmission method using the physical channels.

The following description of embodiments of the present disclosure may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA may be implemented with such a radio technology as UTRA (universal terrestrial radio access), CDMA 2000 and the like. TDMA may be implemented with such a radio technology as GSM/GPRS/EDGE (Global System for Mobile communications)/General Packet Radio Service/Enhanced Data Rates for GSM Evolution). OFDMA may be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present disclosure may be non-limited. Specific terminologies used in the following description are provided to help understand the present disclosure and the use of the terminologies may be modified to a different form within a scope of the technical idea of the present disclosure.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/user equipment (UE) that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Some LTE/LTE-A operations and configuration that are not at variance to a design of New RAT may also be applied to new RAT. For convenience, new RAT may be referred to as 5G mobile communication.

<NR Frame Structure and Physical Resource>

In an NR system, downlink (DL) and downlink (UL) transmission may be performed through frames having duration of 10 ms and each frame may include 10 subframes. Accordingly, 1 subframe may correspond to 1 ms. Each frame may be divided into two half-frames.

1 subframe may include $N_{symb}^{subframe,\mu}=N_{symb}^{slot} \times N_{slot}^{subframe,\mu}$ contiguous OFDM symbols. $N_{symb}^{slot}$ represents the number of symbols per slot, $\mu$ represents OFDM numerology, and $N_{slot}^{subframe,\mu}$ represents the number of slots per subframe with respect to corresponding $\mu$. In NR, multiple OFDM numerologies shown in Table 1 below may be supported.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In Table 1 above, $\Delta f$ refers to subcarrier spacing (SCS). $\mu$ and cyclic prefix with respect to a DL carrier bandwidth part (BWP) and $\mu$ and cyclic prefix with respect to a UL carrier BWP may be configured for a UE via UL signaling.

Table 2 below shows the number of $N_{symb}^{slot}$ of symbols per slot, the number $N_{slot}^{frame,\mu}$ of symbols per frame, and the number $N_{slots}^{subframe,\mu}$ of slots per subframe with respect to each SCS in the case of normal CP.

TABLE 2

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 3 below shows the number $N_{symb}^{slot}$ of symbols per slot, the number $N_{slot}^{frame,\mu}$ of slots per frame, and the number $N_{slot}^{subframe,\mu}$ of slots per subframe with respect to each SCS in the case of extended CP.

TABLE 3

| μ | $N_{symb}^{slot}$ | $N_{slot}^{frame, μ}$ | $N_{slot}^{subframe, μ}$ |
|---|---|---|---|
| 2 | 12 | 40 | 4 |

As such, in an NR system, the number of slots included in 1 subframe may vary depending on the SCS. OFDM symbols included in each slot may correspond to any one of D (DL), U (UL), and X (flexible). DL transmission may be performed in a D or X symbol and UL transmission may be performed in a U or X symbol. A Flexible resource (e.g., X symbol) may also be referred to as a Reserved resource, an Other resource, or a Unknown resource.

In NR, one resource block (RB) may correspond to 12 subcarriers in the frequency domain. A RB may include a plurality of OFDM symbols. A resource element (RE) may correspond to 1 subcarrier and 1 OFDM symbol. Accordingly, 12 REs may be present on 1 OFDM symbol in 1 RB.

A carrier BWP may be defined as a set of contiguous physical resource blocks (PRBs). The carrier BWP may also be simply referred to a BWP. A maximum of 4 BWPs may be configured for each of UL/DL link in 1 UE. Even if multiple BWPs are configured, 1 BWP may be activated for a given time period. However, when a supplementary uplink (SUL) is configured in a UE, 4 BWPs may be additionally configured for the SUL and 1 BWP may be activated for a given time period. A UE may not be expected to receive a PDSCH, a PDCCH, a channel state information—reference signal (CSI-RS), or a tracking reference signal (TRS) out of the activated DL BWP. In addition, the UE may not be expected to receive a PUSCH or a PUCCH out of the activated UL BWP.

<NR DL Control Channel>

In an NR system, a transmissions NR system, a transmission unit of a control channel may be defined as a resource element group (REG) and/or a control channel element (CCE), etc.

An REG may correspond to 1 OFDM symbol in the time domain and may correspond to 1 PRB in the frequency domain. In addition, 1 CCE may correspond to 6 REGs.

A control resource set (CORESET) and a search space (SS) are briefly described now. The CORESET may be a set of resources for control signal transmission and the search space may be aggregation of control channel candidates for perform blind detection. The search space may be configured for the CORESET. For example, when one search space is defined on one CORESET, a CORESET for a common search space (CSS) and a CORESET for a UE-specific search space (USS) may each be configured. As another example, a plurality of search spaces may be defined in one CORESET. For example, the CSS and the USS may be configured for the same CORESET. In the following example, the CSS may refer to a CORESET with a CSS configured therefor and the USS may refer to a CORESET with a USS configured therefor, or the like.

A BS may signal information on a CORESET to a UE. For example, a CORESET configuration for each CORESET and time duration (e.g., 1/2/3 symbol) of the corresponding CORESET may be signaled. When interleaving for distributing a CCE to 1 symbol-CORESET is applied, 2 or 6 REGs may be bundled. Bundling of 2 or 6 REGs may be performed on 2 symbol-CORESET and time-first mapping may be applied. Bundling of 3 or 6 REGs may be performed on 3 symbol-CORESET and time-first mapping may be applied.

When REG bundling is performed, the UE may assume the same precoding with respect to a corresponding bundling unit.

<Slot Format Indication in FDD>

In an embodiment of the present disclosure, it is defined which slot format related information (SFI) a UE needs to follow upon receiving SFIs over both a GC-PDCCH and UE-specific downlink control information (DCI). For example, priorities between the GC-PDCCH and the UE-specific DCI may be determined. In other words, priorities on which information the UE needs to follow when the UE has two pieces of information may be determined. In addition, it is defined how the UE operates when the GC-PDCCH and UE-specific DCI have low reliability. Further, a relationship between the GC-PDCCH and a semi-static configuration is also defined.

1. With Flexible Duplex Operation

A slot format indication (SFI) refers to information indicating the format of a slot corresponding to a time unit. In frequency division duplex (FDD), the SFI may not be used since different frequency bands are used for DL and UL. However, when flexible duplex is used in DL/UL frequency bands, transmission and reception directions in the time domain need to be indicated. Thus, the network may provide the SFI to the UE. In addition, when resources are reserved or flexibly changed, the network may also provide the SFI to the UE.

(1) SFI Contents

When the UE use two bands for the FDD, SFIs for the two bands may be indicated as follows.

Downlink/Uplink (D/U)
Downlink/Unknown (D/X)
Unknown/Uplink (X/U)
Unknown/Unknown (X/X)

The SFI may be used only when the direction of each FDD band (e.g., D/U/X) is changed. For example, in the conventional FDD system, the direction of each band is fixed. However, according to an embodiment of the present disclosure, the direction may be changed by giving flexibility to the FDD band direction.

(2) With Full Flexibility

The network may inform the UE of the slot format for the entirety of a band, but the network may use the corresponding band as time division duplex (TDD) by improving the flexibility of a slot used in the corresponding band. In this case, the UE may operate as if the UE has multiple TDD frequency bands. For example, the UE may be allowed to perform dynamic TDD operation on an unpaired spectrum among individual UL/DL spectrums.

Single SFI: The same SFI may be indicated for all bands used by the UE (including the UL/DL spectrums). In this case, although one UE uses multiple component carriers (CCs), the multiple CCs used by the UE may be regarded as one CC from the perspective of a cell. For example, from the perspective of the cell, it may be regarded that there are multiple CCs and some of the multiple CCS are configured for the UE.

Multiple SFIs: The SFI may be indicated independently for each band used by the UE or for each UL/DL spectrum. In this case, from the perspective of the cell, it may be regarded that there are multiple CCs and some of the multiple CCS are configured for the UE. For example, from the perspective of the cell, it may be regarded that different SFIs are configured for different CCs.

Independent indication: When indicating the SFI for each FDD band connected to the UE, the network may indicate independent SFIs for different bands. This SFI method may be used in an environment where there is no interference between bands even though the bands have opposite directions, for example, an environment where each FDD band has a sufficient guard band. According to the present embodiment, each band may have a different direction in the same slot, and D/U/X may be indicated independently for each band.

Connected bands dependent indication: When indicating the SFI for each FDD band connected to the UE, the network may indicate the SFI by considering each band. This SFI method may be used in an environment where each band has the opposite direction and thus inter-band interference is caused, for example, an environment where each FDD band has no sufficient guard band.

The network may indicate the SFI such that D and U are not simultaneously configured at least for the same slot. In addition, after determining whether D/X, U/X, and X/X are simultaneously configured, the network may provide the SFI to the UE.

2. UL Timing Determination

By providing the SFI for a FDD UL band, the network may maintain the U direction or switch to another direction. The UL timing for the corresponding UL band may be predefined. Here, the UL timing may mean duration from the time when the UE receives UL grant DCI to the time when the UE transmits a PUSCH.

The UE may determine whether to maintain the predefined UL timing based on the received SFI, that is, depending on whether the corresponding UL band is maintained or switches to another direction. Alternatively, in spite of using the FDD band, the network may dynamically provide not only the UL timing but also a HARQ-ACK timing to the UE in DCI under consideration of the flexible duplex operation.

Meanwhile, it needs to be defined how the UE operates when the direction of a resource is changed (e.g., into a D or X resource) at the time when it is expected that the UE will transmit the PUSCH after receiving the UL grant DCI.

When the network dynamically informs a timing (e.g., in UL grant DCI), it is assumed that the resource direction changed by the SFI may cause no problem because the indicated timing is determined by the network.

(1) SFI Indication Before UL Timing Determination

The GC-PDCCH may carry the SFI for a UL band. When the SFI indicates D, the UE may not transmit the PUSCH. When the SFI indicates U, the UE may transmit the PUSCH. When the SFI indices X, the UE may not confirm whether PUSCH transmission is enabled but regard that the transmission is allowed in some cases. For example, the network may provide the UL timing (and/or HARQ-ACK timing) to the UE depending on the direction indicated by the SFI on the GC-PDCCH.

The network may use the following options to dynamically indicate the UL/HARQ-ACK timing.

Option 1: The network may inform the UL timing only for a region where the SFI indicates U. In Option 1, the network and UE need to be accurately aligned with respect to U. Accordingly, Option 1 may be applied only when the GC-PDCCH is reliable or when a UL resource is semi-statically fixed. That is, a case in which the GC-PDCCH is reliable or a case in which the UL resource is semi-statically fixed may be counted.

Option 2: The network may define the UL timing for both U and X indicated by the SFI. If an X resource is selected for UL signal transmission based on the UL timing, the corresponding X resource may be changed in to a U resource based on DCI or dynamic scheduling DCI. In Option 2, the network and UE need to be aligned with respect to U/X in a similar way to Option 1.

Option 3: The network may provide an absolute timing (e.g., in terms of slots or symbols) as the UL timing to the UE regardless of D/U/X. The network may adjust the timing value such that no D/X resource is present while a UL signal is transmitted. In Option 3, overhead may slightly increase.

As described above, the UE may confirm that the UE is capable of transmitting a UL signal (e.g., PUSCH) on the U resource. In addition, the UE may recognize the UE may transmit the PUSCH on the X resource.

The network may inform the UE of the UL timing for a U period with no problem. However, if the network informs the UL timing for an X period, the UE needs to determine whether to transmit the PUSCH. If Option 2 is applied, the network may inform the UE of not only the usage of the X resource but also information on whether the UE is allowed to randomly override the X resource.

(2) SFI Indication After UL Timing Determination

The UE may receive the UL timing first and then receive the SFI. If the direction of a slot corresponding to the previously indicated UL timing is changed by the SFI, the UE may be incapable of transmitting the PUSCH. Hereinafter, how the UE operates in this case will be described.

UE ignores SFI: When the UE receives a UL grant, if the SFI indicates other directions other than U for a slot where PUSCH transmission is reserved, the UE may ignore the SFI and then transmit the PUSCH based on the UL grant.

UE ignores PUSCH: If the SFI indicates other directions other than U for the slot where the PUSCH transmission is reserved even though the UE receives the UL grant, the UE may drop the PUSCH transmission in accordance with the received UL grant. If necessary, the UE may request the network to transmit the UL grant again.

UL timing expansion: When the UE receives the UL timing correctly and then receives the SFI correctly as well, the UE may report the network that the UE correctly receives the SFI. In this case, since the network recognizes that the UE correctly receives the SFI, the UE may delay the PUSCH transmission by considering the SFI. To delay the timing of the PUSCH transmission, the following four options may be considered. Meanwhile, since the network recognizes that the UE correctly receives the UL timing and the SFI, it is assumed that the network is capable of accurately anticipating when the PUSCH delayed by the UE will be received according to the following options.

(i) Option 1: The UE may determine a new UL timing by adding a time delayed by the SFI to the current UL timing. In this case, the network may recognize that the UE automatically determines the new UL timing. It may be defined that the UE mandatorily transmits the PUSCH at the new UL timing. For example, the delay of the UL timing may be allowed once. If the UE has no sufficient U resources to transmit the PUSCH after delaying the UL timing, the UE drops the PUSCH transmission and then request the network to transmit a new UL grant.

(ii) Option 2: If the UE has no sufficient U resources to transmit the PUSCH at the next UL timing according to the SFI although the UL timing is delayed once as in Option 1, the UE may ignore the SFI. For example, the delay of the UL timing may be allowed once, and the UE may need to transmit the PUSCH mandatorily by ignoring the SFI. Option 2 may be available when the SFI indicates X.

(iii) Option 3: Although the UE may transmit the PUSCH at the new UL timing, it may be difficult for the UE to transmit the entirety of the PUSCH in a direction defined by the SFI. The UE may transmit a part of the PUSCH as much as possible and then transmit the remaining part thereof by determining a next UL timing. The UE may repeat the above process until the PUSCH is completely transmitted. The UE may automatically re-determine UL timings for distributed transmission of the PUSCH based on the received SFI, and the network may assume that the UE is capable of re-determining the UL timings autonomously. Alternatively, the network may re-determine the UL timings and then transmit information on the re-determined UL timings to the UE within a time delayed by the re-determined UL timings.

(iv) Option 4: When determining that it is difficult to transmit the entirety of the PUSCH at the first obtained UL timing, the UE may delay the PUSCH transmission until receiving information about a UL timing at which the UE is capable of transmitting the entirety of the PUSCH from the network. Alternatively, instead of requesting, by the UE, the new UL grant, when determining that it is difficult for the UE to transmit the entirety of the PUSCH at the corresponding UL timing, the network may automatically define the new UL timing and then inform the UE of the new UL timing. In addition, the UE may expect that the new UL timing is transmitted from the network.

<SFI for mmWave>

A millimeter wave (mmWave) may be used in a multiple-input and multiple-output (MIMO) environment and a multi-beam environment. When the network intends to transmit specific control information in the multi-beam environment, if the network transmits the same control information via all beams, it may be a large burden to the system. Considering that the SFI needs to be delivered not only to a scheduled UE but also to a non-scheduled UE, it is very difficult to successfully transmit the SFI to UEs connected to different beams. Accordingly, the present disclosure proposes how to transmit the SFI to the UEs.

1. CORESET in Slot Including SS Block

The network may transmit the SFI based on the periodicity of a synchronization signal block (SS block). A control resource set (CORESET) to which the GC-PDCCH carrying the SFI is capable of being mapped may be configured based on the periodicity of the SS block. The corresponding CORESET may be used to transmit not only the GC-PDCCH but also other control channels such as a common PDCCH, a UE-specific PDCCH, etc. In particular, the CORESET for other control channels may be equal to or partially overlap with that for the GC-PDCCH carrying the SFI. Alternatively, the CORESETs may be separately defined.

To transmit the GC-PDCCH to multiple UE, beam sweeping may be performed.

The SS block is a necessary feature even though it is a burden to the system. Thus, the network may transmit the SS block and the SFI by aligning the SS block and the SFI to minimize a load depending on the SFI transmission. Considering that the SS block is transmitted over multiple beams, the network may transmit a data/control channel, which is transmitted based on the beam sweeping, using the same symbols and beams as those for the SS block, thereby performing the beam sweeping of the data/control channel without additional overhead.

Figure 2:
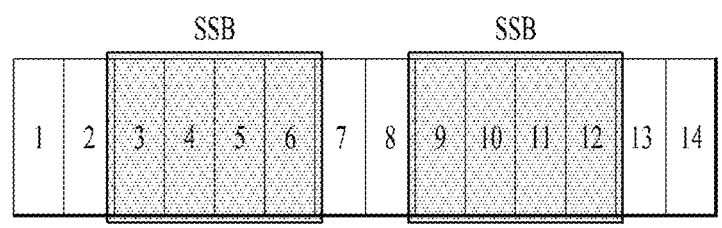
FIG. 2 illustrates a deployment of synchronization signal (SS) blocks in a slot according to an embodiment of the present disclosure.
Figure 2:
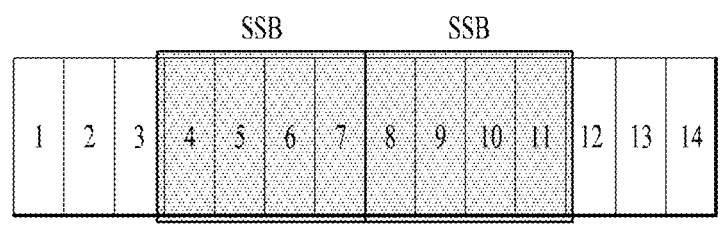

FIG. 2 illustrates a deployment of SS blocks (SSBs) in a slot according to an embodiment of the present disclosure.

For convenience of description, it is assumed that one slot includes 14 symbols.

In FIG. 2, a region denoted by "SSB" means a region in which the SSB is capable of being transmitted. However, no SSB may be transmitted in the SSB region. It is assumed that a CORESET for the GC-PDCCH is located at the left side of the slot.

Alternatively, the CORESET for the GC-PDCCH or a CSS may be configured in the same symbols as the SSB, but they may be configured at different frequency locations.

The CORESET for the GC-PDCCH or the SS may be identical to a CORESET or an SS for scheduling remaining system information (RMSI) (e.g., system information block 1).

The minimum bandwidth (BW) of the SSB is defined as $B_{SSB}$. When the SSB is transmitted, if the BW of the CORESET for the GC-PDCCH is similar or equal to $B_{SSB}$, symbols 1, 2 and 7 may be designated as the CORESET for the GC-PDCCH as shown in FIG. 2 (*a*), or symbols 1, 2 and 3 may be designated as the CORESET for the GC-PDCCH as shown in FIG. 2 (*b*). When no SSB is transmitted, the CORESET may be defined across symbols 1 to 7.

When the SSB is transmitted, if the BW of the CORESET for the GC-PDCCH is greater than $B_{SSB}$, the network may configure the CORESET for the GC-PDCCH using symbols 1 to 7 but exclude a region for the SSB transmission from the CORESET for the GC-PDCCH. When no SSB is transmitted, the CORESET may be defined across symbols 1 to 7.

Alternatively, the BS or UE may assume that a PDCCH in an SS where the beam sweeping is performed is transmitted using the same symbols and beams as those for the SSB as described above. The frequency location of the SS may be changed depending on a bandwidth part (BWP) configured for the UE.

Meanwhile, the network may map data to an unused resource in the CORESET for the GC-PDCCH according to a higher layer configuration or perform data rate matching on the entirety of the CORESET for the GC-PDCCH.

Further, the network may perform rate matching on the SSB for the CORESET in consideration of the SSB transmission. For example, the network may perform the rate matching on all SSB symbols with respect to the BW of a PBCH. Alternatively, in the case of a primary synchronization signal/secondary synchronization signal (PSS/SSS) transmission symbol, the network may perform the rate matching only on RBs in which a PSS/SSS is transmitted.

2. GC-PDCCH in resource of SSB

As described above, the SSB may or may not be transmitted in the SSB region of FIG. 2. If no synchronization signal is transmitted in a region reserved for the SSB, the network may transmit the GC-PDCCH carrying the SFI in the corresponding region.

If the amount of resources for the GC-PDCCH is not large, the network may transmit the GC-PDCCH using RBs, which are not used for the PSS/SSS, in a symbol for transmitting the PSS/SSS within the SSB. Meanwhile, since the PBCH is transmitted in 24 RBs and the PSS/SSS is transmitted in 12 RBs, each PSS/SSS transmission symbol may include 12 RBs not used for the PSS/SSS.

In this case, the UE may decode the GC-PDCCH using a demodulation reference signal (DM-RS) for the PBCH.

3. SFI Transmission in Other Resources

The network may transmit the SFI in DCI scheduling RMSI. Generally, common control information for scheduling the RMSI may be transmitted based on the beam sweeping. That is, since the common control information including the RMSI needs to be received by all UEs, the common control information may be repeatedly transmitted based on the beam sweeping. Thus, if the network combines the SFI with the RMSI, the network may not necessarily define resource configuration/signaling for transmitting the SFI. The UE may not necessary perform an operation for searching for the SFI.

As another method, the network may transmit the SFI on a paging resource and a beam management RS transmission resource. The RMSI, paging, and beam management RS are information/signals requiring the beam sweeping, and for the SFI, the beam sweeping may be performed to enable all UEs to read the SFI. If the network is capable of transmitting the SFI together with the information/signals accompanied by the beam sweeping, the network may reduce the system load. Considering that the frequency location of the BWP may be configured differently for each UE, the beam sweeping may be performed for multiple CORESETs (for example, for the GC-PDCCH carrying the SFI) at different frequency locations within one symbol. If the UE needs to read the multiple CORESETs, the UE may assume that CORESET monitoring is performed in the BWP configured for the UE.

4. Cross Carrier Transmission

A method of transmitting an SFI corresponding to a mmWave band on a different carrier may be considered. When an SFI is indicated based on the reference numerology and an SFI based on another numerology, which is matched with the SFI based on the reference numerology, is configured/defined in advance even though the numerology of a carrier for SFI transmission is different from that for the mmWave band, there may be no problem.

However, it may be problematic that a slot for loading the SFI may or may not be aligned with that for the mmWave band at the same time. Even though the slots are aligned, it may be difficult for the network to transmit the SFI in the mmWave band slot having the same starting time as the slot for loading the SFI. This is because when the UE reads the SFI, the UE needs to read the mmWave band slot at the same time.

Figure 3:
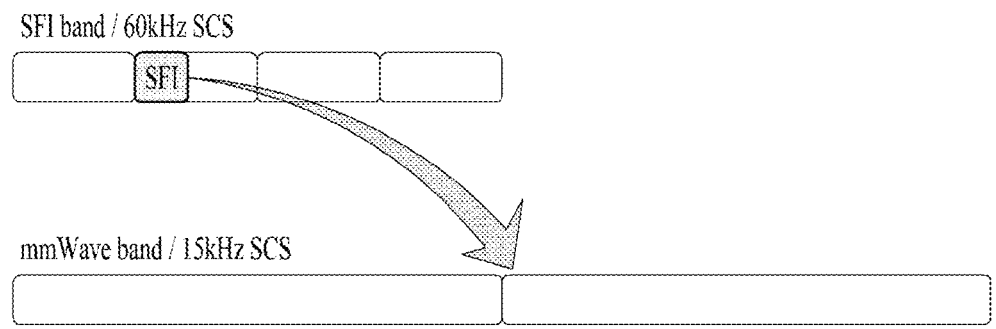
FIG. 3 illustrates an example of applying an SFI when the subcarrier spacing of a carrier for transmitting the SFI is larger than that of a carrier in a mmWave band.

When the slot for loading the SFI is not aligned with the mmWave band slot (for example, when the SCS of an SFI band is larger than that of the mmWave band as shown in FIG. 3), the slot for loading the SFI may be located at the middle of the mmWave band slot. In this case, it may be defined the SFI is for a slot next to the mmWave band slot including the slot for loading the SFI.

Figure 4:
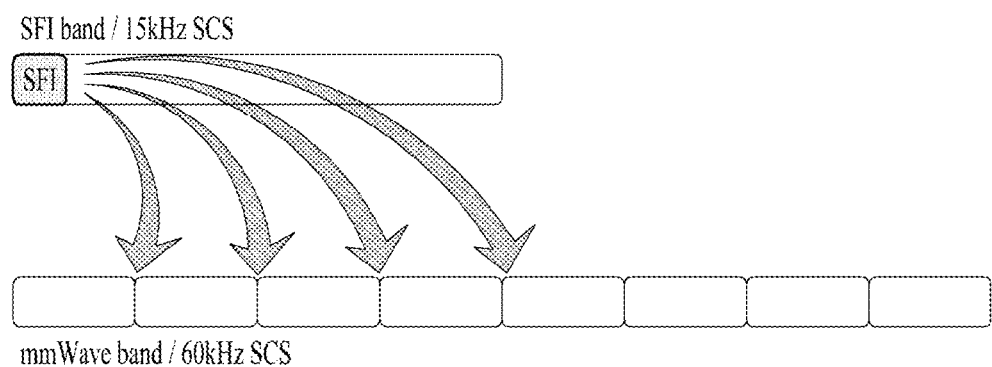
FIG. 4 illustrates an example of applying an SFI when the subcarrier spacing of a carrier for transmitting the SFI is smaller than that of a carrier in a mmWave band.

On the other hand, when the SCS of the SFI band is smaller than that of the mmWave band as shown in FIG. 4, the end of the SFI transmission slot may always be aligned with the end of the mmWave band slot. The SFI transmission slot may include multiple mmWave band slots. It may be predefined which slot among the multiple mmWave band slots included in the SFI transmission slot the slot format indicated by the SFI is related to. For example, by considering a processing time required for the UE to read the SFI, it may be defined that the SFI is for the second slot among the mmWave band slots or for the mmWave band slot located after the end of the SFI transmission slot. The definition of the slot to which the SFI is applied may be provided to the UE through higher layer signaling. Alternatively, it may be defined which mmWave band slot the corresponding SFI is started to be applied to. Further, the UE may assume that the SFI is for slots on the mmWave carrier, which are located after the carrier for the SFI transmission.

<SFI for Supplementary UL (SUL)>

The UE may use SUL in the following two cases: when the UE transmits an NR UL signal in an LTE UL band while being connected only to the NR; and when the UE transmits an NR UL signal in an LTE UL band while being connected to both the NR and LTE.

An LTE UL band available for an NR UE may be predefined by radio resource control (RRC) or higher layer signaling. In addition, the configuration of a resource capable of being used for NR UL in an LTE UL band region may be semi-statically configured for the UE. Although the NR UE has information on an available LTE UE band resource, the NR UE may not know whether the corresponding resource is actually available. Thus, the NR UE needs to obtain permission from the network to understand which resource the NR UE is capable of using when transmitting its UL signal.

The SFI may provide such permission. For example, the SFI may indicate X for a resource that is available but not allocated to the NR UE. The SFI may indicate U for a resource that is available and actually used by the NR UE for UL transmission. If UE-specific DCI (e.g., UL grant) is capable of overriding X, the NR UE may transmit a UL signal on an LTE UL band resource indicated as X based on the DCI. In this case, the UE-specific DCI may be interpreted as dynamic permission.

<Following PUCCH Structure>

The network may transmit the GC-PDCCH in order to send the SFI. Since the SFI may contain slot format information on multiple carriers, multiple slots, etc., the payload size of the SFI may be variable. Alternatively, when the SFI has a static payload size, there may be various static payload sizes. In addition, the structure of the GC-PDCCH carrying the SFI needs to be defined, but it is difficult to define one fixed channel structure due to the variable size.

To solve the problems, it may be considered that the structure of a PUCCH is applied to the GC-PDCCH. For example, when the SFI is transmitted for one slot on one carrier, the SFI has a relatively small payload size, for example, about 1 or 2 bits. That is, the payload size of the SFI may depend on the number of slots and the number of carriers. When the payload size of the SFI is small, the network may repeatedly transmit the SFI and drop a CRS to reduce overhead.

When the PUCCH structure is applied to the GC-PDCCH, different PUCCH formats may be used depending on the size of the SFI. In addition, since whether an orthogonal code (e.g., orthogonal cover code), channel coding, or a cyclic redundancy check (CRC) is used may vary for each PUCCH format, the GC-PDCCH may have various structures. For example, since PUCCH formats 1, 2 and 3 have a structure similar to an LTE physical channel hybrid ARQ indicator channel (PHICH) with no CRC and PUCCH format 4 has a structure similar to a PDCCH where the CRC is added, the PUCCH formats may support the GC-PDCCH having various payload sizes.

When the payload size of the GC-PDCCH is equal to or less than a predetermined value (e.g., X bits), the network may configure the GC-PDCCH based on PUCCH format 1 or 2. In PUCCH format 1, each bit is repeatedly transmitted, and in PUCCH format 2, UCI is encoded using a Reed-Muller (RM) code. The reuse of the PUCCH format for the GC-PDCCH may mean that the coding scheme, CRC, and/or data-to-channel mapping scheme of the PUCCH format is reused.

The payload size of the GC-PDCCH is more than the predetermined value (e.g., X bits), the GC-PDCCH may be configured based on PUCCH format 3 or 4. In general, the GC-PDCCH is encoded using a double RM code, but when the GC-PDCCH is larger than the predetermined value, the network may encode the GC-PDCCH using a polar code and add the CRC thereto.

In PUCCH formats 1, 2 and 3, since the same information is repeatedly mapped multiple times, it is capable of obtaining similar effects to when the same information is repeatedly transmitted. On the other hand, in PUCCH format 4, the effect of repeating the same information is not obtained. However, PUCCH format 4 has advantages in that decoding performance is improved due to the CRC and the payload size increases.

Since the payload size of the GC-PDCCH is variable, the network may need to use a PUCCH format suitable for each payload size in terms of efficiency. For example, the network may change the coding scheme, CRC, and/or mapping scheme depending on the payload size. For example, the network may divide the payload size into the following cases: when the payload size is one or two bits; when the payload size is more than two bits less than K bits; and when the payload size is more than K bits. For those cases, the network may respectively apply the following methods: repetition with no CRC, use of the RM code with no CRC; and use of the polar code with the CRC.

1. Resource Allocation as CCE Structure

The PUCCH has a structure where multiple REGs are arranged along a line in the time domain. The GC-PDCCH may be allocated on a CCE basis as in the PDCCH. However, in this case, it is difficult to apply the above PUCCH allocation method as it is. In particular, in the case of a DMRS (DM-RS) for the PUCCH, since the DMRS occupies all symbols, it has a different structure from the PDCCH. If the network is capable of configuring a 6-symbol PUCCH, the network may configure the GC-PDCCH as follows. That is, since one CCE is composed of 6 REGs, one CCE may be configured by arranging the 6-symbol PUCCH in the frequency domain. For example, a 6-symbol and 1-RB PUCCH may be arranged on a CCE basis. In this case, since the DMRS needs to be arranged in the frequency domain, the DMRS structure of the PDCCH may be applied.

Alternatively, the network may reuse the structure of a short PUCCH for the GC-PDCCH. For the short PUCCH, one or two symbols are used. In this case, two symbols may be obtained by repeating one symbol. For the GC-PDCCH, the network may perform the repetition in the frequency domain instead of mapping the GC-PDCCH to two symbols. Alternatively, the network may map resources with respect to one CCE and perform coding and mapping in each CCE.

Since no orthogonal cover code (OCC) may be required in DL, the OCC may not be applied to the GC-PDCCH. In addition, scrambling, sequences, etc. may be selected based on a cell ID or a CORESET ID.

For example, a DL CORESET structure may be applied to GC-PDCCH resource allocation. In this case, the network may allocate resources used for the GC-PDCCH at the REG level or CCE level.

2. Resource Allocation as REG Level

When the PUCCH size is not an integer multiple of 6 REGs, the network may reserve multiple REGs (e.g., 1, 2, 4, or 8 REGs) to arrange the GC-PDCCH based on the PUCCH structure. If the network adjusts the size of the PUCCCH at a multiple of the REG by controlling repetitions while using the PUCCH format, the GC-PDCCH may be arranged in an REG basis. This operation may be interpreted to mean that the network secures a resource region for the GC-PDCCH in advance and arranges the GC-PDCCH in the secured resource region based on the PUCCH structure, instead of arranging the GC-PDCCH on a CCE basis.

<Support Various Payload Size>

As described above, the GC-PDCCH may support various payload sizes. When configuring the GC-PDCCH, the network may use the PUCCH structure as described above. Alternatively, the network may configure the GC-PDCCH based on a PDCCH structure or a physical control format indicator channel (PCFICH) structure. For example, although the network may configure the GC-PDCCH based on the structure of the PUCCH, PDCCH, or PCFICH, the network may follow the PDCCH structure when arranging the GC-PDCCH. The network may arrange the GC-PDCCH on a CCE basis, and the number of CCEs included in the GC-PDCCH may be changed to support various payload sizes.

To allocate resources for the GC-PDCCH, an SS for the GC-PDCCH may be configured. The SS may be configured based on the number of CCEs or an aggregation level (AL) supported for the GC-PDCCH. Alternatively, the location of the resources used for the GC-PDCCH may be determined depending on the number of CCEs or AL. The configuration of the SS for the GC-PDCCH may be interpreted to mean that there are multiple candidates regarding the number of CCEs or AL supported for the GC-PDCCH. When resources available for the GC-PDCCH are fixed, it may be interpreted to mean that there is one candidate regarding the number of CCEs or AL supported for the GC-PDCCH.

1. Explicit Configuration of GC-PDCCH's CCE or AL

When the UE is configured to monitor the GC-PDCCH, information on the payload size, the number of CCEs, and/or the AL of the GC-PDCCH to be transmitted may be provided to the UE. Specifically, the configuration for GC-PDCCH monitoring and the information on the payload size, the number of CCEs, and/or the AL of the GC-PDCCH may be provided to the UE through RRC or higher layer signaling.

When the information on the GC-PDCCH is correctly delivered, the overhead and complexity of UE's GC-PDCCH decoding may be decreased. When the SS for the GC-PDCCH is configured, if the UE intends to perform blind decoding of the GC-PDCCH in the SS, the UE may perform the blind decoding in a part of the SS based on the information on the payload size, the number of CCEs, and/or the AL of the GC-PDCCH provided from the network. Thus, the number of times that the UE actually performs the blind decoding may be smaller than the number of times of the blind decoding in the entirety of the SS. Alternatively, when the resources available for the GC-PDCCH are fixed, the UE may attempt decoding on the resources based on the received information on the payload size, the number of CCEs, and/or the AL of the GC-PDCCH, thereby reducing the UE's decoding complexity.

2. Transparently Decode GC-PDCCH

Meanwhile, even when the UE does not know the information on the payload size, the number of CCEs, and/or the AL of the GC-PDCCH to be transmitted from the network, the UE may receive the GC-PDCCH.

When intending to perform the blind decoding in the SS, the UE may need to perform blind detection for all potential candidates to detect the GC-PDCCH since the UE does not have information on the resources allocated for the GC-PDCCH. In this case, although the number of times of that the blind decoding is performed increases, the UE has no problem in receiving the GC-PDCCH.

When the resources available for the GC-PDCCH are fixed, the UE may need to attempt the decoding on all resources. In this case, although the number of times of that the decoding is performed increases, the UE has no problem in receiving the GC-PDCCH.

3. Implicit Decoding

The UE's decoding scheme may be indicated either explicitly or implicitly based on the information on the payload size, the number of CCEs, and/or the AL of the GC-PDCCH.

For example, the UE may assume that the BS uses different encoding depending on the payload size of the GC-PDCCH. When the reference payload size is X bits, if the payload size of the GC-PDCCH is equal to or less than X bits, the BS may perform encoding based on the RM code with no CRC. If the payload size of the GC-PDCCH is more than X bits, the BS may perform encoding based on the polar code with the CRC. If the UE exactly knows the payload size of the GC-PDCCH, the UE may accurately perform the decoding based on the payload size of the GC-PDCCH.

If the UE does not know the payload size of the GC-PDCCH, the UE may implicitly assume an encoder to perform the decoding. For example, the encoder may be applied differently depending on the number of CCEs or the AL. The criterion of applying the encoder may be predefined or indicated by RRC or higher layer signaling. For example, when the GC-PDCCH is configured with AL 4 or 8, the UE may assume a payload size equal to or less than X bits for AL 4 and assume a payload size more than X bits for AL 8. As another example, when the GC-PDCCH is configured with one or multiple CCEs, the UE may assume the payload size equal to or less than X bits for one to four CCEs and assume the payload size more than X bits for five CCEs or more.

Figure 5:
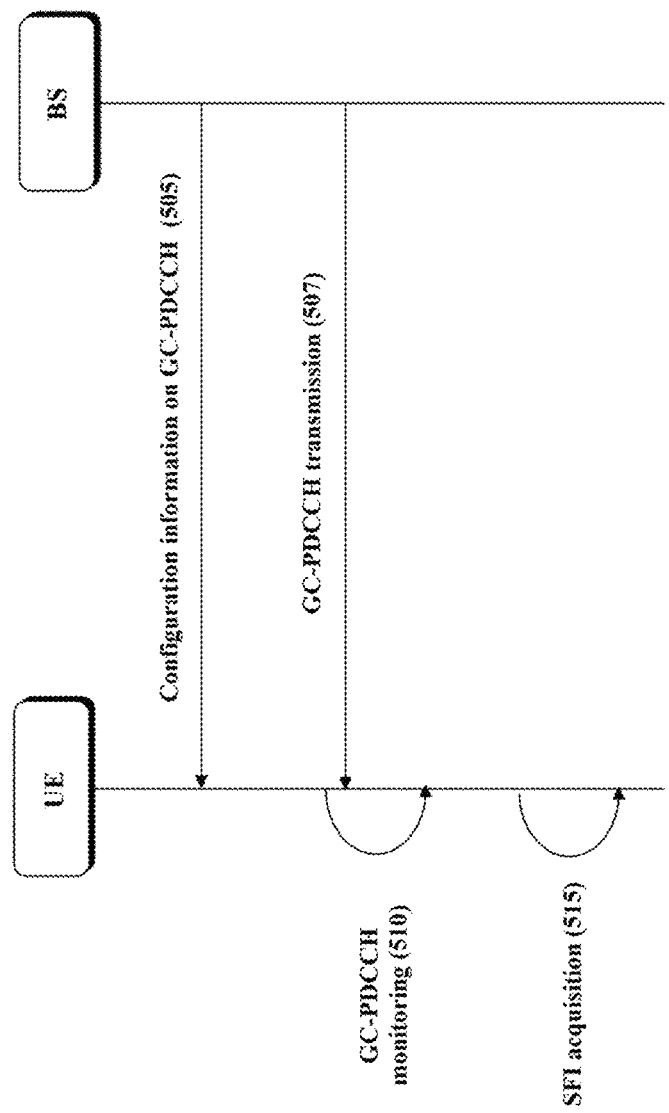
FIG. 5 is a flowchart illustrating a method of transmitting and receiving a downlink signal according to an embodiment of the present disclosure.

FIG. 5 is a flowchart illustrating a method of transmitting and receiving a DL signal according to an embodiment of the present disclosure. The method illustrated in FIG. 5 is one example of implementing the above-described embodiments, and the scope of the present disclosure is not limited thereto. The aforementioned details may be applied thereto.

Referring to FIG. 5, a UE receives configuration information on a GC-PDCCH (505). The configuration information on the GC-PDCCH may include information on the payload size of the GC-PDCCH that the UE needs to monitor (e.g., the payload size of DCI including an SFI) and information on the CCE AL of the GC-PDCCH that the UE needs to monitor. The information on the payload size of the GC-PDCCH and the information on the CCE AL of the GC-PDCCH may be received via higher layer signaling (e.g., RRC signaling). The information on the payload size of the GC-PDCCH and the information on the CCE AL of the GC-PDCCH may be provided together in one RRC message or separately through information elements.

The UE may monitor the GC-PDCCH in a CORESET based on the information on the payload size of the GC-PDCCH and the information on the CCE AL of the GC-PDCCH (510).

The UE may obtain an SFI from the GC-PDCCH (515).

For example, the UE may monitor the GC-PDCCH on a first carrier and determine the slot format of a second carrier based on the SFI obtained from the GC-PDCCH on the first carrier. When the SCS of the first carrier is different from that of the second carrier, the UE may start to apply the determined slot format to a slot located after the slot on the second carrier, which corresponds to the time at which the UE obtains the SFI. The second carrier may be a carrier in a mmWave frequency band.

The CORESET for the GC-PDCCH and an SSB may be included in the same slot, and the periodicity of the CORESET may be determined by the periodicity of the SSB.

When the SFI changes the direction of a UL resource on which the UE is to transmit a PUSCH, the UE may ignore the SFI and perform the PUSCH transmission, drop the PUSCH transmission and request a BS to send a UL grant again, or delay the PUSCH transmission by a predetermined time based on the SFI.

Figure 6:
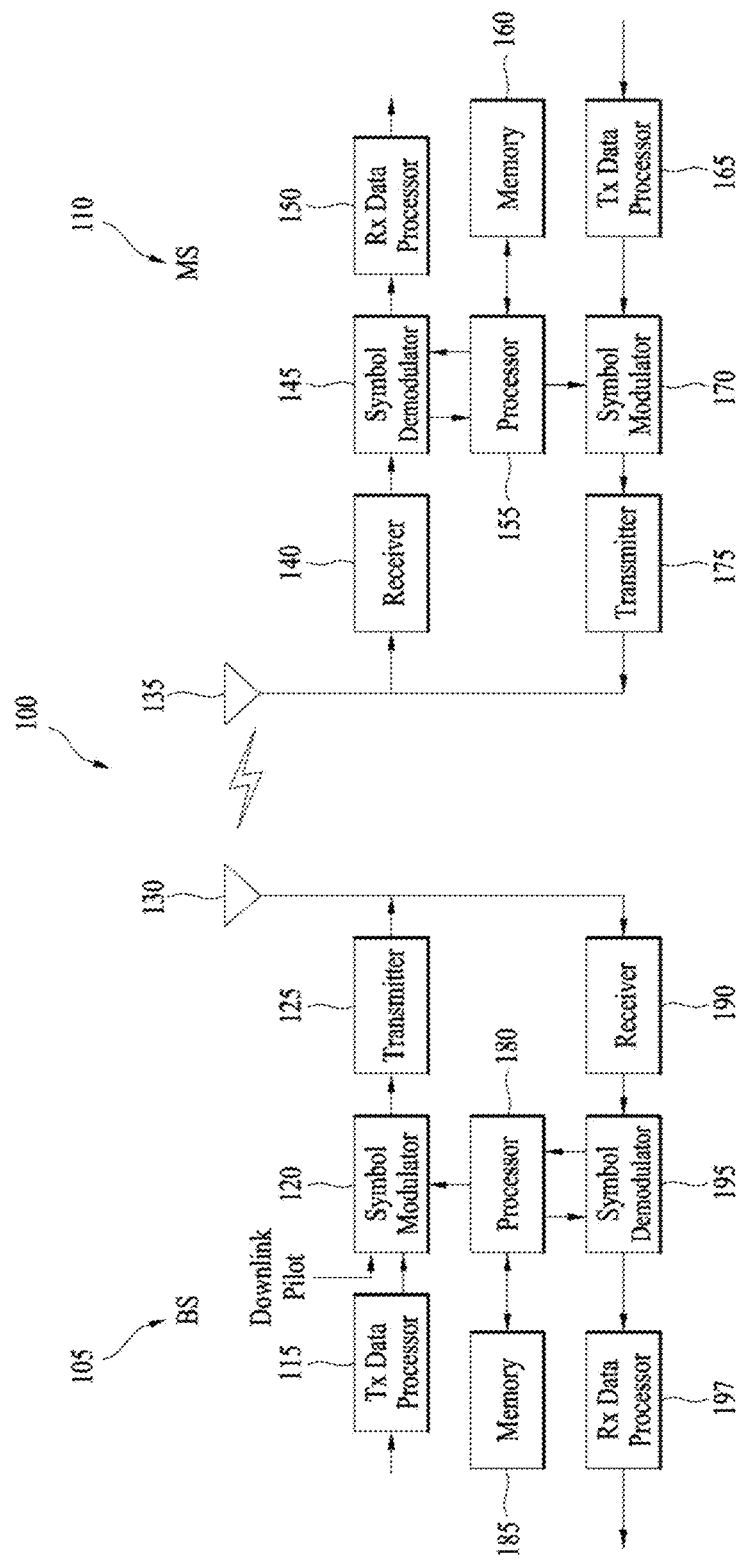
FIG. 6 is a block diagram of a user equipment (UE) and a base station (BS) according to an embodiment of the present disclosure.

FIG. 6 is a block diagram illustrating a structure of a base station (BS) 105 and a UE 110 in a wireless communication system 100 according to an embodiment of the present disclosure. The BS 105 may be referred to as an eNB or a gNB. The UE 110 may be referred to a user terminal.

Although one BS 105 and one UE 110 are illustrated for simplifying the wireless communication system 100, the wireless communication system 100 may include one or more BSs and/or one or more UEs.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present disclosure support a Multiple Input Multiple Output (MIMO) system. The BS 105 according to the present disclosure may support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it may provide a stream of symbols to the transmitter 175. The transmitter 175 obtains and processes the stream of symbols to generate an uplink (UL) signal, and the UL signal is transmitted to the BS 105 through the antenna 135. The transmitter and the receiver of UE/BS may be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it may store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present disclosure may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present disclosure may be implemented in the form of modules, procedures, functions, etc. which perform the above-described functions or operations. Firmware or software implemented in the present disclosure may be contained in the processor 155 or 180 or the memory unit 160 or 185, such that it may be driven by the processor 155 or 180.

Radio interface protocol layers among the UE 110, the BS 105, and a wireless communication system (i.e., network) may be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present disclosure in prescribed forms. And, it is able to consider that the respective elements or features are selective unless they are explicitly mentioned. Each of the elements or features may be implemented in a form failing to be combined with other elements or features. Moreover, it is able to implement an embodiment of the present disclosure by combining elements and/or features together in part. A sequence of operations explained for each embodiment of the present disclosure may be modified. Some configurations or features of one embodiment may be included in another embodiment or may be substituted for corresponding configurations or features of another embodiment. And, it is apparently understandable that an embodiment is configured by combining claims failing to have relation of explicit citation in the appended claims together or may be included as new claims by amendment after filing an application.

While the present disclosure has been described and illustrated herein with reference to the preferred embodiments thereof, it will be apparent to those skilled in the art that various modifications and variations may be made therein without departing from the spirit and scope of the disclosure. Thus, it is intended that the present disclosure covers the modifications and variations of this disclosure that come within the scope of the appended claims and their equivalents.

As described above, the present disclosure may be applied to various wireless communication systems.

The invention claimed is:

1. A method of receiving a downlink signal by a user equipment (UE) in a wireless communication system, the method comprising:

receiving, through higher layer signaling, (i) information regarding a specific payload size from among a plurality of candidate payload sizes of a group common-physical downlink control channel (GC-PDCCH), related to a variable-length slot format indication (SFI) information and (ii) information regarding a control channel element (CCE) aggregation level of the GC-PDCCH; and obtaining an SFI for the UE through the GC-PDCCH in a control resource set (CORESET) based on the information regarding the specific payload size of the GC-PDCCH and the information regarding the CCE aggregation level of the GC-PDCCH, wherein, in a case where the UE is indicated to transmit a physical uplink shared channel (PUSCH) on a specific resource and the specific resource is not indicated as 'uplink (UL)' by the SFI, the UE performs the PUSCH transmission on the specific resource which is not indicated as 'UL' by the SFI.

2. The method of claim 1, wherein the GC-PDCCH is received in a first carrier, and wherein the UE determines a slot format of a second carrier based on the SFI.

3. The method of claim 2, wherein based on different subcarrier spacings between the first and second carriers, the UE applies the determined slot format to a slot located after a slot on the second carrier, and wherein the slot on the second carrier relates to a time at which the SFI is obtained.

4. The method of claim 1, wherein the CORESET for the GC-PDCCH and a synchronization signal block (SSB) are included in a same slot, and wherein a periodicity of the CORESET is determined based on a periodicity of the SSB.

5. The method of claim 2, wherein the second carrier is a carrier in a millimeter wave (mmWave) frequency band.

6. A non-transitory medium which is readable by a processor and storing instructions that cause the processor to perform the method of claim 1.

7. A user equipment (UE) for transmitting a downlink signal, the UE comprising:
a transceiver; and
a processor configured to:
control the transceiver to receive, through higher layer signaling, (i) information regarding a specific payload size from among a plurality of candidate payload sizes of a group common-physical downlink control channel (GC-PDCCH), related to a variable-length slot format indication (SFI) information and (ii) information regarding a control channel element (CCE) aggregation level of the GC-PDCCH; and
obtain an SFI for the UE through the GC-PDCCH in a control resource set (CORESET) based on the information regarding the specific payload size of the GC-PDCCH and the information regarding the CCE aggregation level of the GC-PDCCH,
wherein in a case where the UE is indicated to transmit a physical uplink shared channel (PUSCH) on a specific resource and the specific resource is not indicated as 'uplink (UL)' by the SFI, the UE performs the PUSCH transmission on the specific resource which is not indicated as 'UL' by the SFI.

8. The UE of claim 7, wherein the GC-PDCCH is received in a first carrier, and wherein the processor is configured to determine a slot format of a second carrier based on the SFI.

9. The UE of claim 8, wherein based on different subcarrier spacings between the first and second carriers, the processor is configured to applies the determined slot format to a slot located after a slot on the second carrier, and wherein the slot on the second carrier relates to a time at which the SFI is obtained.

10. The UE of claim 7, wherein the CORESET for the GC-PDCCH and a synchronization signal block (SSB) are included in a same slot, and wherein a periodicity of the CORESET is determined based on a periodicity of the SSB.

11. The UE of claim 8, wherein the second carrier is a carrier in a millimeter wave (mmWave) frequency band.

12. The UE of claim 7, wherein the UE is capable of communicating with at least one of another UE, a UE related to an autonomous driving vehicle, a base station or a network.

13. A method of transmitting a downlink signal by a base station (BS) in a wireless communication system, the method comprising:

transmitting, to at least one user equipment (UE) through higher layer signaling, (i) information regarding a specific payload size from among a plurality of candidate payload sizes of a group common-physical downlink control channel (GC-PDCCH), related to a variable-length slot format indication (SFI) information and (ii) information regarding a control channel element (CCE) aggregation level of the GC-PDCCH; and transmitting, to the at least one UE, an SFI through the GC-PDCCH in a control resource set (CORESET) based on the information regarding the specific payload size of the GC-PDCCH and the information regarding the CCE aggregation level of the GC-PDCCH, wherein, in a case where a physical uplink shared channel (PUSCH) is scheduled on a specific resource and the specific resource is not indicated as 'uplink (UL)' by the SFI, the BS performs a reception for the PUSCH on the specific resource which is not indicated as 'UL' by the SFI.

14. A base station (BS) for transmitting a downlink signal, the BS comprising:

a transceiver; and a processor configured to control the transceiver to transmit, to at least one user equipment (UE) through higher layer signaling, (i) information regarding a specific payload size from among a plurality of candidate payload sizes of a group common-physical downlink control channel (GC-PDCCH), related to a variable-length slot format indication (SFI) information, and (ii) information regarding a control channel element (CCE) aggregation level of the GC-PDCCH; and to control the transceiver to transmit, to the at least one UE, an SFI through the GC-PDCCH in a control resource set (CORESET), based on the information regarding the specific payload size of the GC-PDCCH and the information regarding the CCE aggregation level of the GC-PDCCH, wherein, in a case where a physical uplink shared channel (PUSCH) is scheduled on a specific resource and the specific resource is not indicated as 'uplink (UL)' by the SFI, the processor performs a reception for the PUSCH on the specific resource which is not indicated as 'UL' by the SFI.

* * * * *